US009224355B2

(12) United States Patent
Wu et al.

(10) Patent No.: US 9,224,355 B2
(45) Date of Patent: Dec. 29, 2015

(54) INTERACTIVE SYSTEM AND METHOD FOR OPERATING A PLURALITY OF FLEXIBLE DISPLAYS TO IMPLEMENT INTERACTIVE OPERATION

(71) Applicant: INSTITUTE FOR INFORMATION INDUSTRY, Taipei (TW)

(72) Inventors: Yeh-Kuang Wu, New Taipei (TW); Jing-Ming Chiu, Taipei (TW); Yu-Chieh Huang, Taoyuan County (TW); Ren-Dar Yang, Hsinchu (TW)

(73) Assignee: Institute for Information Industry, Taipei (TW)

( * ) Notice: Subject to any disclaimer, the term of this patent is extended or adjusted under 35 U.S.C. 154(b) by 248 days.

(21) Appl. No.: 13/829,833

(22) Filed: Mar. 14, 2013

(65) Prior Publication Data

US 2013/0271352 A1    Oct. 17, 2013

(30) Foreign Application Priority Data

Apr. 11, 2012   (TW) .............................. 101112739 A

(51) Int. Cl.
*G06F 1/16* (2006.01)
*G09G 5/00* (2006.01)
*G06F 3/14* (2006.01)
*G06F 3/147* (2006.01)

(52) U.S. Cl.
CPC ................ *G09G 5/00* (2013.01); *G06F 1/1652* (2013.01); *G06F 1/1675* (2013.01); *G06F 1/1684* (2013.01); *G06F 3/147* (2013.01); *G06F 3/1446* (2013.01); *G09G 2356/00* (2013.01); *G09G 2360/144* (2013.01); *G09G 2380/02* (2013.01)

(58) Field of Classification Search
CPC .......... G09G 2380/02; G09G 2356/00; G09G 2360/144; G06F 3/1446; G06F 3/147; G06F 1/1652; G06F 1/1684; G06F 1/1675
USPC ........................................... 345/1.1, 173–175
See application file for complete search history.

(56) References Cited

U.S. PATENT DOCUMENTS

| 2007/0195010 | A1* | 8/2007 | Toriumi et al. ................. 345/1.3 |
| 2007/0273609 | A1* | 11/2007 | Yamaguchi et al. ........... 345/1.1 |
| 2010/0167646 | A1 | 7/2010 | Alameh et al. |

(Continued)

FOREIGN PATENT DOCUMENTS

| CN | 102317996 A | 1/2012 |
| TW | 201026000 A | 7/2010 |
| TW | 201201096 A | 1/2012 |

*Primary Examiner* — Sahlu Okebato
(74) *Attorney, Agent, or Firm* — Birch, Stewart, Kolasch & Birch, LLP

(57) ABSTRACT

A method for operating a plurality of flexible displays to implement an interactive operation among the plurality of flexible displays is provided. The method is used between the plurality of flexible displays and a system control platform. Each flexible display is configured with a plurality of light sensors and a plurality of sensors and a processor. The method includes: quantifying, by each light sensor, a external luminosity value received by each flexible display; quantifying, by each sensor, a sensor-measuring value received by each flexible display; generating and transmitting, by the processor coupled to the light sensors and the sensors, luminosity information and sensor information according to the external luminosity values and the sensor-measuring values; and receiving, by the information platform, the luminosity information and the sensor information, and implements the interactive operation among the plurality of flexible displays between the plurality of flexible displays according to the sensor information.

20 Claims, 7 Drawing Sheets

(56) References Cited

U.S. PATENT DOCUMENTS

2011/0037742 A1 2/2011 Suh
2012/0015665 A1* 1/2012 Farley et al. ............... 455/456.1
2013/0314346 A1 11/2013 Yamazaki et al.

* cited by examiner

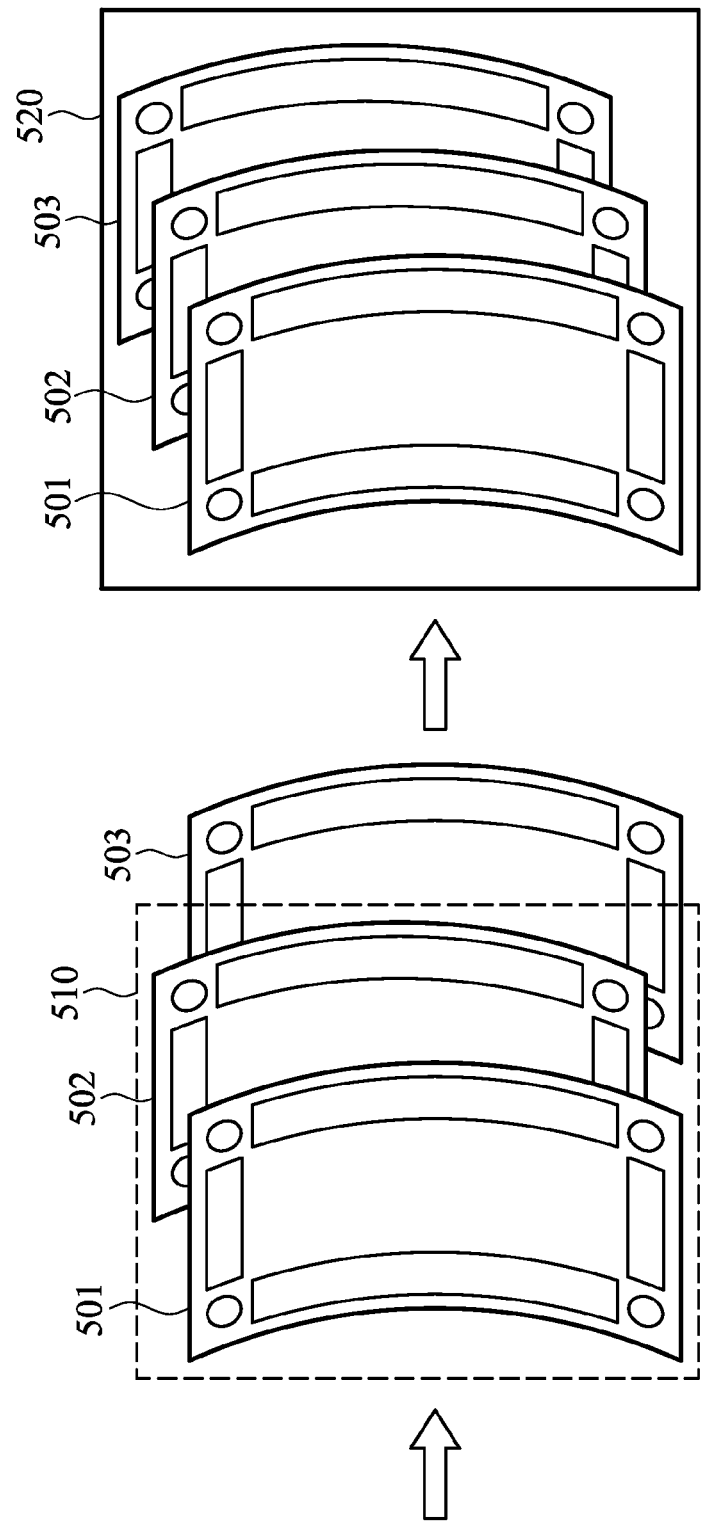

INTERACTIVE SYSTEM AND METHOD FOR OPERATING A PLURALITY OF FLEXIBLE DISPLAYS TO IMPLEMENT INTERACTIVE OPERATION

CROSS REFERENCE TO RELATED APPLICATIONS

This Application claims priority of Taiwan Patent Application No. 101112739, filed on Apr. 11, 2012, the entirety of which is incorporated by reference herein.

BACKGROUND OF THE INVENTION

1. Field of the Invention

The present invention relates to an interactive system, method and machine-readable storage medium for operating a plurality of flexible displays to implement an interactive operation among the plurality of flexible displays, and in particular relates to a system, method and machine-readable storage medium for operating a plurality of flexible displays to implement an interactive operation among the plurality of flexible displays through sensing signals of light sensors and sensors installed in the plurality of flexible displays.

2. Description of the Related Art

To seek the progress of civilization, humans always have done their utmost for developing messaging technology. Bamboo, paper can be considered as the earliest example. The development of the cathode ray tube (CRT) started the first revolution of displays. Because the development of flat-panel display (FPD) has bloomed in the current decade, the second revolution of displays has been driven and continues to affect the lives of people. After the development of electronic displays and flat panel displays, research institutions around the world continue to develop flexible displays as they seek to start a new trend and the next revolution of displays.

Since this flexible display is light weight, thin, flexible, impact-resistant, and not easy to be broken into pieces, it provides people with personalized services and more convenience for users to carry. It is expected to change the lifestyle of its users in the 21st century. A paper-like flexible display can replace paper and save costs for non-printing. Paper-like flexible displays can be applied for books, labels, posters, bulletin boards, etc. A high-end dynamic flexible display can replace traditional electronic displays and consumer electronic displays and provide people with portability and convenience to collect.

However, there are various applications of the flexible display for controlling and operating the displayed contents, such as touch and bend. There are no applications for operating multiple flexible displays to execute interactive behaviors according to the characteristics of the flexible display. Therefore, if the characteristics of the flexible display can be used for multiple flexible displays to interact and communicate with other flexible displays, the user-friendliness of using multiple flexible displays can be further enhanced and the user can use multiple flexible displays in more applications.

BRIEF SUMMARY OF THE INVENTION

A detailed description is given in the following embodiments with reference to the accompanying drawings.

Systems, methods and machine-readable storage mediums for operating a plurality of flexible displays to implement an interactive operation among the plurality of flexible displays are provided.

In one exemplary embodiment, the disclosure is directed to an interactive system for operating a plurality of flexible displays, comprising: a plurality of flexible displays, wherein each flexible display comprises: a plurality of light sensors, wherein each light sensor is used to quantify an external luminosity value received by the flexible display; a plurality of sensors, wherein each sensor is used to quantify a sensor-measuring value received by the flexible display, and each sensor is one of a pressure sensor and a bending sensor; the sensor-measuring value corresponding to the pressure sensor is a pressure value, and the sensor-measuring value corresponding to the bending sensor is a bending value; and a processor, coupled to the plurality of light sensors and the plurality of sensors and used to generate and transmit luminosity information and sensor information according to the external luminosity values and the sensor-measuring values; and a system control platform, coupled to the plurality of flexible displays and used to receive the luminosity information and the sensor information, determining a primary and secondary relationship of the plurality of flexible displays according to the luminosity information, and implement an interactive operation among the plurality of flexible displays according to the sensor information.

In one exemplary embodiment, the disclosure is directed to an interactive method for operating a plurality of flexible displays, used between the plurality of flexible displays and a system control platform, wherein each flexible display comprises a plurality of light sensors, a plurality of sensors and a processor, the method comprises: quantifying, by each light sensor, an external luminosity value received by the flexible display; quantifying, by each sensor, a sensor-measuring value received by the flexible display, and each sensor is one of a pressure sensor and a bending sensor; the sensor-measuring value corresponding to the pressure sensor is a pressure value, and the sensor-measuring value corresponding to the bending sensor is a bending value; and generating and transmitting, by the processor which is coupled to the plurality of light sensors and the plurality of sensors, luminosity information and sensor information according to the external luminosity values and the sensor-measuring values; and receiving, by the system control platform which is coupled to the plurality of flexible displays, the luminosity information and the sensor information, determining a primary and secondary relationship of the plurality of flexible displays according to the luminosity information, and implementing an interactive operation among the plurality of flexible displays according to the sensor information.

In one exemplary embodiment, the disclosure is directed to a non-transitory computer-readable medium comprising computer programs, which, when executed, cause a device to perform an interactive method for operating a plurality of flexible displays, and the method is used between the plurality of flexible displays and a system control platform, wherein each flexible display comprises a plurality of light sensors, a plurality of sensors and a processor; each light sensor quantifies an external luminosity value received by the flexible display, and each sensor quantifies a sensor-measuring value received by the flexible display; each sensor is one of a pressure sensor and a bending sensor; the sensor-measuring value corresponding to the pressure sensor is a pressure value, and the sensor-measuring value corresponding to the bending sensor is a bending value; the processor is coupled to the plurality of light sensors and the plurality of sensors and the system control platform is coupled to the plurality of flexible displays; and the non-transitory computer-readable medium comprises: a first computer program code for generating and transmitting luminosity information and sensor information according to the external luminosity values and the sensor-measuring values after being read by the processor; and a second computer program code for receiving the luminosity information and the sensor information, determining a primary and secondary relationship of the plurality of flexible displays according to the luminosity information, and implementing an interactive operation among the plurality of flexible displays according to the sensor information after being read by the system control platform.

BRIEF DESCRIPTION OF THE DRAWINGS

The present invention can be more fully understood by reading the subsequent detailed description and examples with references made to the accompanying drawings, wherein:

FIGS. 5A~5D are schematic diagrams illustrating the method for determining a primary and secondary relationship of the plurality of flexible displays according to the luminosity information according to an embodiment of the present invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
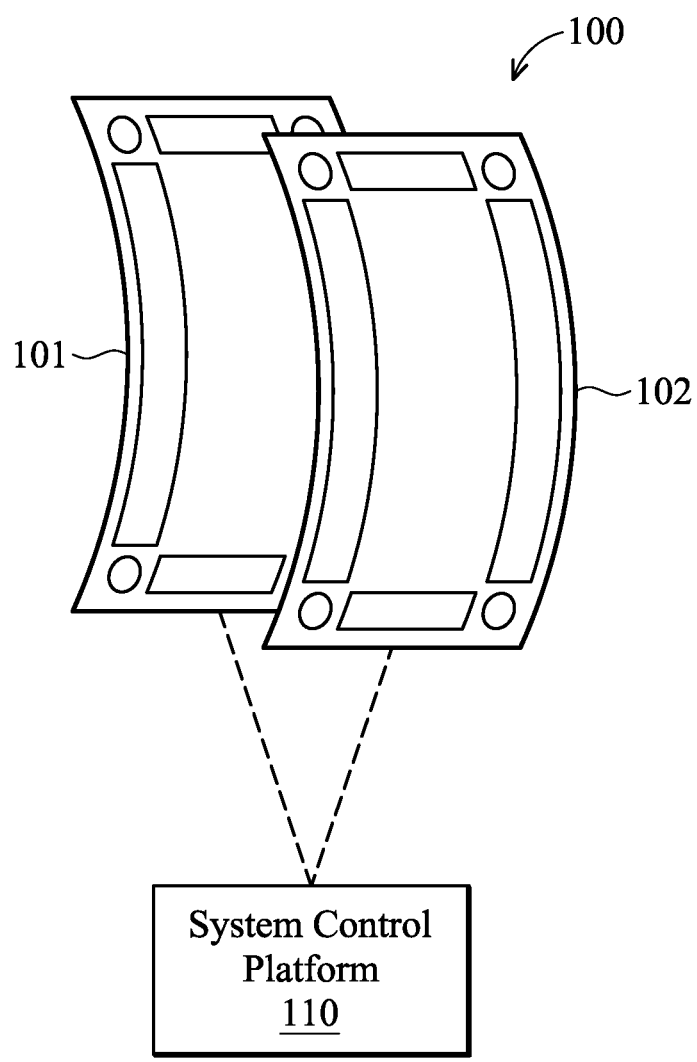
FIG. 1 is an architecture diagram of an interactive system for operating a plurality of flexible displays according to a first embodiment of the present invention.

FIG. 1 is an architecture diagram of an interactive system 100 for operating a plurality of flexible displays according to a first embodiment of the present invention. The interactive system 100 comprises a plurality of flexible displays (such as, a flexible display 101 and a flexible display 102) and a system control platform 110. The flexible displays 101~102 are coupled to the system control platform 110 through a communication network. In another embodiment, the communication network can be a wired or wireless communication network. For example, a local area network (LAN), Internet, Bluetooth, Wi-Fi, Wi-Fi Direct, Zigbee and other communication networks.

Figure 2:
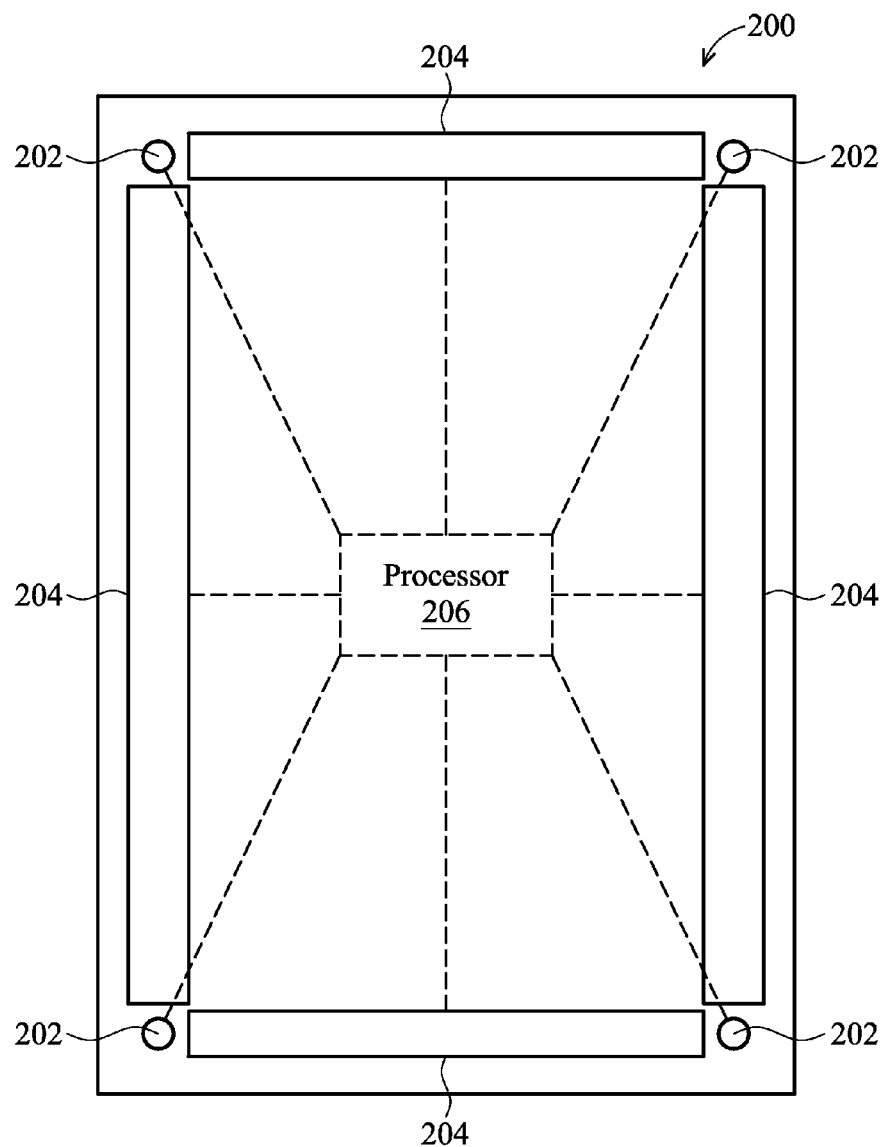
FIG. 2 is a schematic diagram illustrating a flexible display according to an embodiment of the present invention.

The system control platform 110 can be implemented through one or more servers and communication devices (not shown in FIG. 1), and can also be implemented through a computer, such as a personal computer or a notebook computer). Each flexible display can comprise a plurality of light sensors, a plurality of sensors and a processor. As shown in FIG. 2, FIG. 2 is a schematic diagram illustrating a flexible display 200 according to an embodiment of the present invention. A plurality of light sensors 202 can be embedded at the four vertices of the flexible display 200, respectively. Each light sensor 202 is used to quantify an external luminosity value from the environment. In an alternative embodiment, the plurality of light sensors 202 can also be embedded in other positions, such as borders around the flexible display 200, a center of the flexible display 200, or any other position. The number of light sensors 202 may be increased or decreased and not be limited to four. In this embodiment, the plurality of sensors 204 is embedded in the borders around the flexible display 200, respectively. Each sensor 204 is used to quantify a sensor-measuring value received by the flexible display 200. In a preferred embodiment, each sensor is one of a pressure sensor and a bending sensor. Each sensor-measuring value corresponding to the pressure sensor is a pressure value. Each sensor-measuring value corresponding to the bending sensor is a bending value. In an alternative embodiment, the plurality of sensors 204 can be all pressure sensors or all the bending sensors. The plurality of sensors 204 can be also part of the pressure sensors and part of the bending sensors. The plurality of sensors 204 can also be embedded in the borders around the flexible display 200, in the middle of the flexible display 200, or in other any position. The number of the sensors 204 may also be increased or decreased and not be limited to four. The processor 206 is coupled to the light sensors 202 and the sensors 204 to receive the external luminosity values and the sensor-measuring values transmitted by the light sensors 202 and the sensors 204. After receiving the external luminosity values and the sensor-measuring values, the processor 206 generates and transmits luminosity information and sensor information to the system control platform 110. It should be noted that the position of the processor 206 shown in FIG. 2 is only used as an indication. The flexible displays obtained from the marketplace can be coupled to the processor via a wired or wireless signal transmission, and therefore the position of the processor is not limited in the invention.

In general, when a user uses the flexible display, the processor 206 may receive the external luminosity values of the plurality of light sensors and the sensor-measuring values of the plurality of sensors which are embedded on the flexible display at the same time. The processor 206 can execute a process for the received external luminosity values and the received sensor-measuring values to generate luminosity information and sensor information. For example, the processor 206 can filter out the noise from the received external luminosity values and the received sensor-measuring values, determine whether each of the received external luminosity values and the received sensor-measuring values is greater than a predetermined threshold, or calculate the received external luminosity values and the received sensor-measuring values through a formula to generate the luminosity information and the sensor information.

The system control platform 110 determines the primary and secondary relationship of the plurality of flexible displays. In general, the system control platform 110 can select one flexible display from the plurality of flexible displays as a primary flexible display, and the remaining flexible displays as secondary flexible displays. In this embodiment, the system control platform 110 determines the flexible display whose external luminosity value is larger than the others as the primary flexible display, and determines the remaining flexible displays as the secondary flexible displays according to the luminosity information.

It must be noted that the number, shape, and arrangement of the plurality of flexible displays described above is not limited in the embodiments and the figures shown in this invention. In addition, the user can stack and arrange the flexible displays in different arrangements according to the number of the flexible displays to implement a variety of interactive operations.

Further, the interactive operations can be implemented just by a part of the plurality of flexible displays 200. The different interactive operations can be implemented by different parts of the plurality of flexible displays 200 at the same time, wherein the different parts of the plurality of flexible displays 200 connect to the system control platform 110, respectively. Therefore, the system control platform 110 can group some certain flexible displays into a group, determine the primary and secondary relationship of the plurality of flexible displays in the group, and then implement the interactive operation among the plurality of flexible displays.

In another embodiment, each flexible display 200 further comprises a near field communication (NFC) unit (not shown in FIG. 2). The near field communication unit is used to sense other near field communication units of other flexible displays within a specific distance (e.g., 3 cm). When sensing the near field communication units of other flexible displays, the near field communication unit generates sensing data, and then transmits the sensing data to the system control platform 110. The system control platform 110 groups the flexible displays which have the sensing data into the group according to the received sensing data, and implements the interactive operation among the plurality of flexible displays in the group. Furthermore, the near field communication unit can use an active polling process to sense the near field communication unit of other flexible displays one by one, and add the sensed flexible displays into the group in order.

In an alternative embodiment, the system control platform 100 can group a plurality of flexible displays for which the system control platform 100 receives the sensor information transmitted by the plurality of flexible displays in a specific time interval into a group according to times of receiving the sensor information transmitted by the plurality of flexible displays (for example, the time interval could be from five minutes ten seconds past three o'clock (3:05:10) through five minutes twelve seconds past three o'clock (3:05:12), or the time interval is 3 seconds after the system control platform 100 receives the first sensor information). Then, the system control platform 100 implements the interactive operation among the plurality of flexible displays according to the sensor information.

In an alternative embodiment, each flexible display 200 further comprises a storage unit (not shown in FIG. 2). The storage unit is used to store grouping information. The grouping information can be transmitted to the system control platform 110 via the processor 206. The system control platform 110 groups the plurality of flexible displays whose grouping information are same into a group according to the grouping information transmitted by the plurality of flexible displays. Then, the system control platform 100 implements an interactive operation among the plurality of flexible displays according to the sensor information.

The storage unit installed in the flexible display 200 can be further used to store the position information indicating the positions where light sensors and sensors are equipped on each flexible display. The position information is provided for the processor 206 to retrieve. The processor 206 can use the position information and the received plurality of external luminosity values to generate the luminosity information. For example, when the sensor-measuring value is quantified by one or more of the plurality of sensors 204 of the flexible display, the processor 206 receives at least one sensor-measuring value of at least one sensor and obtains the position information of the at least one sensor and the position information of the light sensors from the storage unit. Then, the processor 206 determines at least one neighbor light sensor according to the position information, wherein the distance between each neighbor light sensor and the at least one sensor quantifying the sensor-measuring value is within a specific range (for example, within 1 cm). Finally, the processor 206 generates the luminosity information according to the external luminosity value of the at least one neighbor light sensor. When the system control platform 110 determines the primary and secondary relationship of the plurality of flexible displays 200, the system control platform 110 obtains the external luminosity values according to the luminosity information received by the flexible displays 200 within a specific time interval and determines a relative position between the flexible displays 200 which receive the luminosity information.

Furthermore, when a new flexible display, for example, a first added flexible display, is added in the system after the system control platform 110 determines the primary and secondary relationship, the system control platform 110 can re-determine the primary and secondary relationship between the first added flexible display and the flexible displays which belong to the same group originally. For example, the system control platform re-determines the primary and secondary relationship according to the luminosity information received by the first added flexible display and the flexible displays which belong to a group originally. IF the system control platform determines the first added flexible display as a primary flexible display, the original primary flexible display is changed to a secondary flexible display. If the system control platform determines the first added flexible display as a secondary flexible display, the original primary flexible display remains the primary flexible display.

For re-determining the primary and secondary relationship between the first added flexible display and the flexible displays which belong to the same group originally, the system control platform can determine the primary and secondary relationship according to, for example, but not be limited to, the following three manners:

(1) to re-determine the primary flexible display according to the luminosity information received by all the flexible displays and the first added flexible display;

(2) to re-determine the primary flexible display according to the luminosity information received by the original primary flexible display in the group and the first added flexible display;

(3) to re-determine the primary flexible display according to the luminosity information received by a specific flexible display in the group and the first added flexible display, wherein the specific flexible display can be a flexible display and the first added flexible display receives the sensor information at the same time.

Figure 3B:
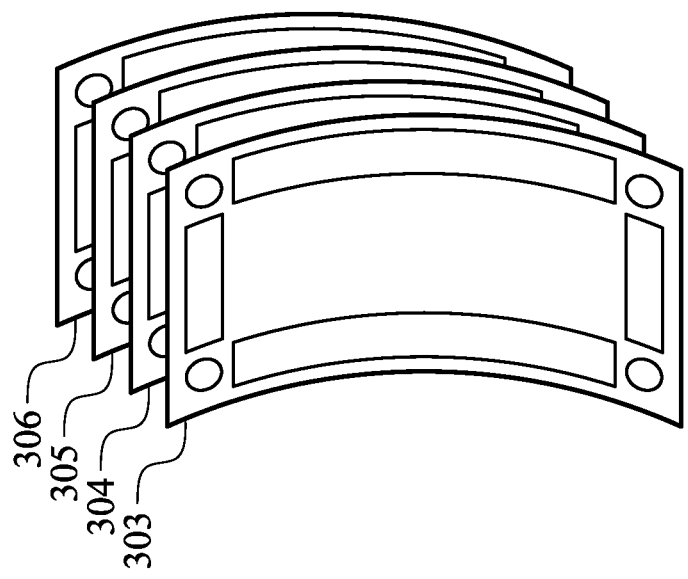
FIGS. 3A~3B are schematic diagrams illustrating the arrangements according to an embodiment of the present invention.
Figure 3A:
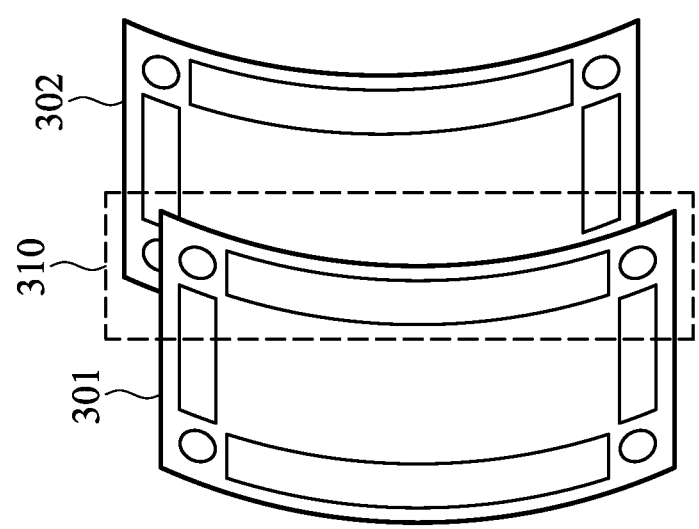

There can be a variety of different arrangements between the plurality of flexible displays 200. For example, the plurality of flexible displays 200 can be stacked like papers or can be laid flat. Several common arrangements are illustrated as follows, but are not to be limited in the present invention. FIGS. 3A~3B are schematic diagrams illustrating the arrangements according to an embodiment of the present invention. As shown in FIG. 3A~3B, FIG. 3A is shown that the flexible displays 301~302 are arranged in the horizontal direction, wherein the flexible display 301 and the flexible display 302 overlap in the region 310 indicated by the dotted line. FIG. 3B is a schematic diagram illustrating that four flexible displays are stacked together, wherein the flexible displays 303~306 are stacked together.

Each flexible display 200 can be provided to the user to operate separately, and multiple flexible displays 200 can also be combined together for the user to use, such as a multi-screen to display. In general, each flexible display 200 has a display size, and the display sizes of the flexible displays 200 may be the same or different. In one embodiment, the multiple flexible displays 200 are used as a multi-screen display and are laid flat. The system control platform 110 determines the primary and secondary relationship of the multiple flexible displays 200. For example, the system control platform 100 finds a flexible display in which the light sensors are not covered with another flexible display as a primary flexible display, and determines the remaining flexible displays as secondary flexible displays. Then, the system control platform 100 divides the display frame of the primary flexible display into multiple sub-display frames, wherein the display frame is a digital content displayed in the flexible display, and does not belong to a hardware device. Finally, the primary flexible display and the secondary flexible displays are displayed in the sub-display frames, respectively.

In another embodiment, for example, when a user knocks adjacent borders of two flexible displays 200 which are adjacent to each other at the same time to implement an interactive operation to combine the contents displayed in the two flexible displays 200 for display, the system control platform 110 determines the primary and secondary relationship of multiple flexible displays 200 according to the sensor-measuring values generated by the sensors 204 at the adjacent borders of two flexible displays 200 which are adjacent to each other at the same time, and then starts to determine the primary and secondary relationship of the flexible displays 200. For example, the system control platform 110 receives the luminosity information transmitted by the processors 206 of the two flexible displays 200 which the sensors generate the sensor-measuring values at the same time. According to the luminosity information, for example the external luminosity values received by the light sensors 202 at the adjacent borders, the system control platform 110 determines a flexible display whose external luminosity value is larger than the others as a primary flexible display, and another flexible display as a secondary flexible display. After the system control platform 110 determines the primary-secondary relationship, the two flexible displays 200 are in a group. When the user want to add a flexible display (such as the first added flexible display described before), the newly added flexible display can be placed next to the primary flexible display or the secondary flexible display. For example, the user knocks a border of the newly added flexible display, wherein the border is adjacent to one of borders of the two flexible displays 200 at the same time, to implement an interactive operation for combining the first added flexible display with the two flexible displays 200 in the above-mentioned group. The procedures for executing and determining the primary and secondary relationship are mentioned above. When the first added flexible display is placed next to the primary flexible display, the system control platform 110 determines a new primary flexible display form the primary flexible display and the first added flexible display by choosing the flexible display having a larger external luminosity value according to the external luminosity values received by the light sensors at the adjacent borders of the first added flexible display and the primary flexible display. If the external luminosity value of the original primary flexible display is larger than the external luminosity value of the newly added first added flexible display, the system control platform 110 determines that the newly added first added flexible display is a secondary flexible display. If the external luminosity value of the newly added first added flexible display is larger than the external luminosity value of the original primary flexible display, the system control platform 110 determines that the newly added first added flexible display is a new primary flexible display and designates the original primary flexible display as a secondary flexible display.

In the embodiment illustrating that two flexible displays 200 are combined for display, the flexible displays 200 are arranged in parallel with each other, wherein the relative position includes relative distances and relative angles between the two flexible displays. In one embodiment, after determining the primary flexible display, the system control platform 110 determines the relative distances and the relative angles between each secondary flexible display and the primary flexible display. In another embodiment, the system control platform 110 can determine the relative distances and the relative angles between each pair of adjacent flexible displays. When the relative angle between the primary flexible display and one of the secondary flexible display is not 0, 90, 180, or 270 degrees, it means that the flexible displays may not be arranged in parallel or vertical, the system control platform 110 divides the display frame into multiple sub-display frames according to the relative distance and the relative angle between the one of the secondary flexible displays and the primary flexible display by calculating a display size and a display angle on the display frame of the one of the secondary flexible displays corresponding to the display frame of the primary flexible display.

Figure 4:
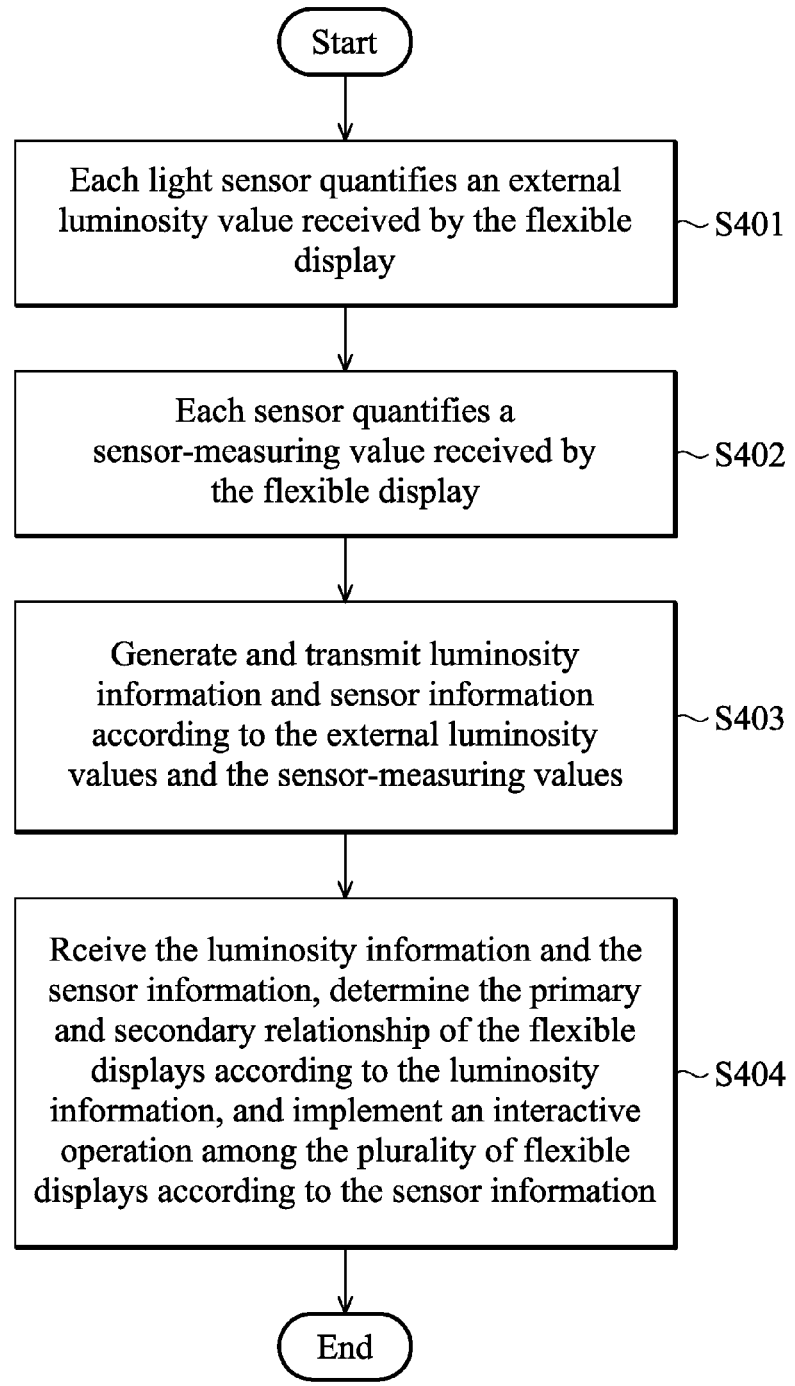
FIG. 4 is a flow diagram illustrating that the method for implementing an interactive operation among the plurality of flexible displays according to a first embodiment of the present invention.

FIG. 4 is a flow diagram illustrating the method for implementing an interactive operation among the plurality of flexible displays according to a first embodiment of the present invention. The plurality of flexible displays can be arranged or stacked as shown in FIG. 3A or FIG. 3B. The method for implementing an interactive operation among the plurality of flexible displays is used between the plurality of flexible displays and the system control platform, wherein each of the flexible displays includes a plurality of light sensors, a plurality of sensors and a processor. A user can flip/knock, or bend the flexible displays so that the sensors installed in the flexible displays can quantify and generate the sensor-measuring values. In step S401, each light sensor quantifies an external luminosity value received by the flexible display. In step S402, each sensor quantifies a sensor-measuring value received by the flexible display, and each sensor is one of a pressure sensor and a bending sensor, wherein the sensor-measuring value corresponding to the pressure sensor is a pressure value, and the sensor-measuring value corresponding to the bending sensor is a bending value. Then, in step S403, the processor is coupled to the light sensor and the sensor. The processor generates and transmits luminosity information and sensor information according to the external luminosity values and the sensor-measuring values. And then, in step S404, the system control platform coupled to the flexible displays receives the luminosity information and the sensor information, determines the primary and secondary relationship of the flexible displays according to the luminosity information, and implements an interactive operation among the plurality of flexible displays according to the sensor information.

In this embodiment, the communication/transmission information, group settings, determination of the primary and secondary relationship and other related technologies are the same as the illustration of the embodiment described above, so the details related to the technologies of the system will be omitted.

In some embodiments, the interactive operation may be the operations such as copying or transmitting the data/files in the secondary flexible displays to the primary flexible display, editing files or data in the primary flexible display and the secondary flexible displays synchronously, or generating an operation instruction in the primary flexible display and transmitting the operation instruction to the secondary flexible displays to execute the operation instructions.

Figures 5A, 5B:
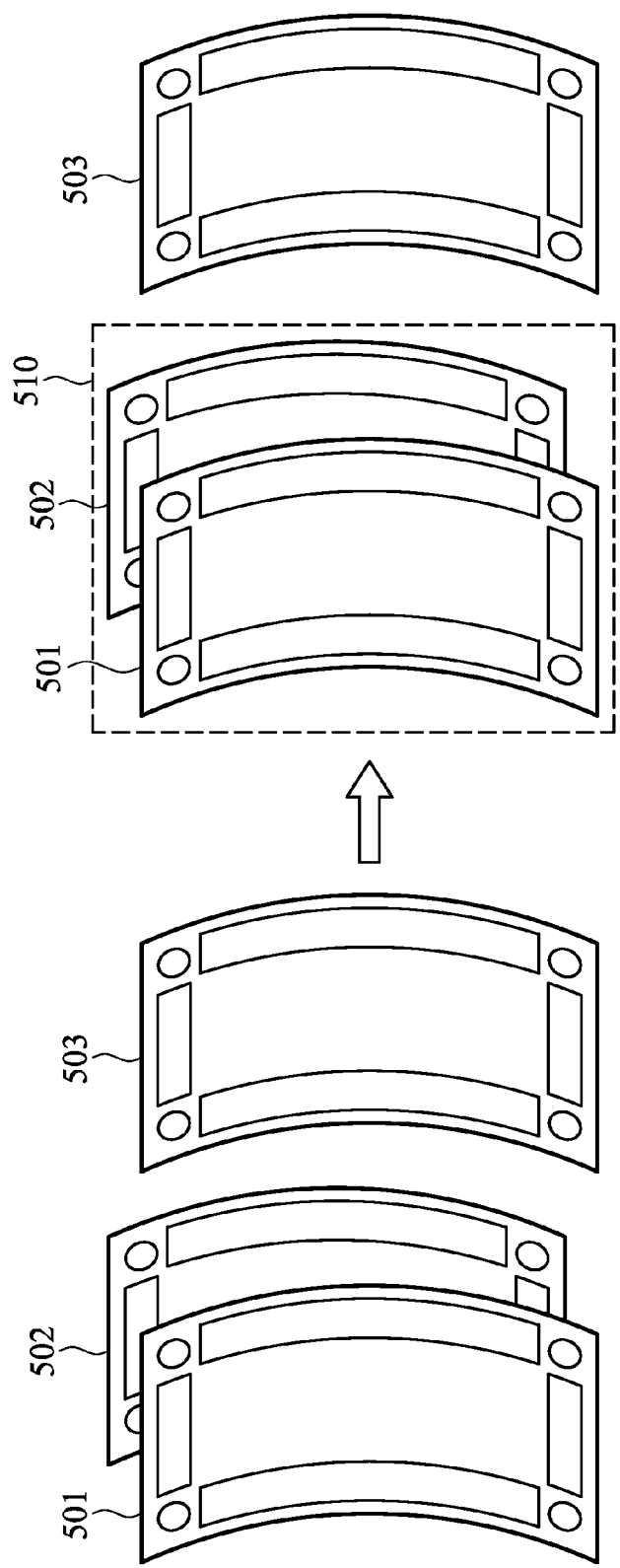

FIGS. 5A~5D are schematic diagrams illustrating the method for determining a primary and secondary relationship of the plurality of flexible displays 501~503 according to the luminosity information according to an embodiment of the present invention. As shown in FIG. 5A, the arrangement of the flexible displays is such that the flexible display 501 is stacked on the flexible display 502. The plurality of light sensors of the flexible displays 501~502 quantifies external luminosity values, and transmits the external luminosity values to the system control platform, respectively. After receiving the external luminosity values transmitted by the flexible displays, the system control platform determines the primary and secondary relationship of the flexible displays 501~502 according to the luminosity information. As shown in FIG. 5B, the external luminosity received by the flexible display 501 is stronger than the external luminosity received by the flexible display 502. Therefore, the system control platform determines the flexible display 501 as a primary flexible display, the flexible display 502 as a secondary flexible display, and combines the sensing areas of the flexible displays 501~502 to form a combination 510 (the block indicated by the dotted line). Then, as shown in FIG. 5C, when a newly added flexible display 503 is placed below the flexible displays 501~502, because the external luminosity received by the combination 510 is stronger than the external luminosity received by the flexible display 503, the system control platform determines that the flexible display 503 is a secondary flexible display, and combines the sensing areas of the flexible display 503 and the combination 510 to form a combination 520 (the block indicated by the solid line). The flexible display 501 is still the primary flexible display of the combination 520. If the external luminosity received by the combination 503 is the stronger than the external luminosity received by the flexible display 510, the flexible display 503 will be the primary flexible display of the combination 520.

In addition, in this embodiment, the sensor-measuring values received by the sensors may be generated via the user flips/knocks, or bends the flexible displays and other operations. An ordinary person skilled in the art can use other actions to trigger the interactive operation between the flexible displays.

Figure 6B:
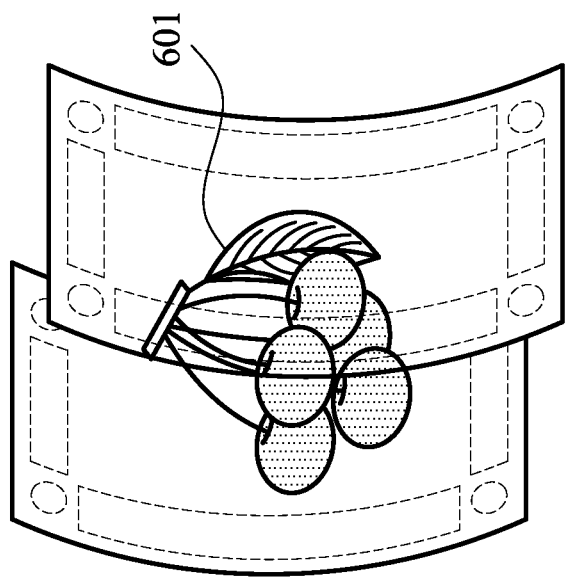
FIGS. 6A~6B are schematic diagrams illustrating that the display frames of the flexible displays are integrated according to an embodiment of the present invention.
Figure 6A:
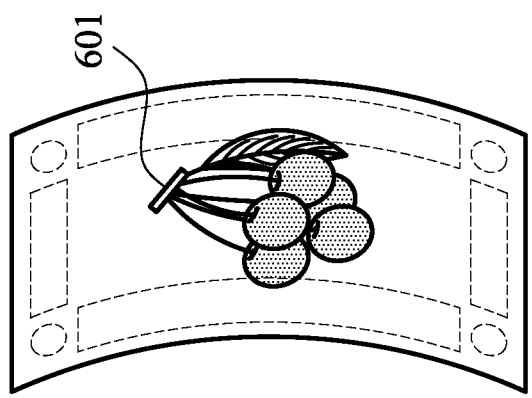

FIGS. 6A~6B are schematic diagrams illustrating that the display frames of the flexible displays are integrated according to an embodiment of the present invention. As shown in FIG. 6A, a display frame of a flexible display only shows a small picture 601 originally. As shown in FIG. 6B, the plurality of flexible displays can be used to extend the display frames of the plurality of flexible displays through the method for operating the plurality of flexible displays to interact among the plurality of flexible displays in this invention, so that the small picture 601 can be enlarged and rendered as a large picture.

Methods for operating the plurality of flexible displays to interact among the plurality of flexible displays, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine thereby becomes an apparatus for practicing the disclosed interactive methods for operating a plurality of flexible displays, wherein the method is used between the plurality of flexible displays and a system control platform. Each flexible display comprises a plurality of light sensors, a plurality of sensors and a processor. Each light sensor is used to quantify an external luminosity value received by the flexible display and each sensor is used to quantify a sensor-measuring value received by the flexible display, wherein each sensor is one of a pressure sensor and a bending sensor. The sensor-measuring value corresponding to the pressure sensor is a pressure value, and the sensor-measuring value corresponding to the bending sensor is a bending value. The processor is coupled to the plurality of light sensors and the plurality of sensors, and the system control platform is coupled to the plurality of flexible displays. The non-transitory computer-readable medium comprises a first computer program code and a second computer program code. After reading the first computer program code, the processor generates and transmits luminosity information and sensor information according to the external luminosity values and the sensor-measuring values. After reading the second computer program code, the system control platform determines a primary and secondary relationship of the plurality of flexible displays according to the luminosity information, and implements an interactive operation among the plurality of flexible displays according to the sensor information. When implemented on a general-purpose processor, the program code combines with the processor to provide a unique apparatus that operates analogously to application-specific logic circuits.

Therefore, the user can use the characteristics of the flexible display to design applications for operating multiple flexible displays to implement interactive behaviors through the method and the interactive system for implementing an interactive operation among the plurality of flexible displays in this invention. Therefore, if the user can use the characteristics of the flexible displays to operate multiple flexible displays for interactive operations and communications, the user can utilize multiple flexible displays in different applications more conveniently and efficiently.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interactive system for operating a plurality of flexible displays, comprising:
   a plurality of flexible displays, wherein each flexible display comprises:
   a plurality of light sensors, wherein each light sensor is used to quantify an external luminosity value received by the flexible display;
   a plurality of sensors, wherein each sensor is used to quantify a sensor-measuring value received by the flexible display, and each sensor is one of a pressure sensor and a bending sensor; the sensor-measuring value corresponding to the pressure sensor is a pressure value, and the sensor-measuring value corresponding to the bending sensor is a bending value; and a processor, coupled to the plurality of light sensors and the plurality of sensors and used to generate and transmit luminosity information and sensor information according to the external luminosity values and the sensor-measuring values; and a system control platform, coupled to the plurality of flexible displays and used to receive the luminosity information and the sensor information, determining a primary and secondary relationship of the plurality of flexible displays according to the luminosity information, and implement an interactive operation among the plurality of flexible displays according to the sensor information.

2. The interactive system for operating a plurality of flexible displays as claimed in claim 1, wherein each the flexible displays further comprises a near field communication unit, used to sense other near field communication units within a specific distance, generate and transmit sensing data to the system control platform; and the system control platform further groups the plurality of flexible displays which sense between each other into a group according to the sensing data and implements the interactive operation among the plurality of flexible displays of the same group according to the sensor information.

3. The interactive system for operating a plurality of flexible displays as claimed in claim 1, wherein each flexible display further comprises a storage unit, used to store grouping information thereof, and transmit the grouping information to the system control platform; and the system control platform further groups the plurality of flexible displays whose grouping information are same into a group according to the grouping information and implements the interactive operation among the plurality of flexible displays among the plurality of flexible displays of the group according to the sensor information.

4. The interactive system for operating a plurality of flexible displays as claimed in claim 1, wherein the system control platform further groups the plurality of flexible displays for which the system control platform receives the sensor information transmitted by the plurality of flexible displays in a specific time interval into a group according to times of receiving the sensor information transmitted by the plurality of flexible displays, and implements the interactive operation among the plurality of flexible displays of the group according to the sensor information.

5. The interactive system for operating a plurality of flexible displays as claimed in claim 1, wherein the system control platform determines a flexible display having a maximum external luminosity value as a primary flexible display and the remaining flexible displays as secondary flexible displays.

6. The interactive system for operating a plurality of flexible displays as claimed in claim 1, wherein when a first added flexible display is added to the plurality of flexible displays after the system control platform determines the primary and secondary relationship of the plurality of flexible displays, the system control platform re-determines the primary and secondary relationship among the first added flexible display and the plurality of flexible displays according to the luminosity information received by the first added flexible display and the plurality of flexible displays.

7. The interactive system for operating a plurality of flexible displays as claimed in claim 1, wherein each flexible display further comprises a storage unit which is used to store position information and the corresponding interactive operation of each sensor in the plurality of flexible displays; and the sensor information includes the sensor-measuring value, the position information and the corresponding interactive operation of the sensor which generates the sensor-measuring value.

8. The interactive system for operating a plurality of flexible displays as claimed in claim 1, wherein each flexible display further comprises a storage unit which is used to store position information indicating the positions where light sensors and sensors are equipped on each flexible display; the luminosity information is generated by receiving the at least one sensor-measuring value of the at least one sensor, obtaining the position information corresponding to the at least one sensor, determining at least one neighboring light sensor, and using at least one external luminosity received by the at least one neighboring light sensor to generate the luminosity information; a distance between the positions of the at least one neighboring light sensor and the at least one sensor is within a specific range; and the luminosity information includes the at least one neighboring external luminosity value and the position information of the at least one neighboring light sensor; and according to the luminosity information received by the plurality of light sensors within a specific time interval, the system control platform determines a relative position between the plurality of flexible displays for which the system control platform receives the luminosity information transmitted by the plurality of flexible displays.

9. The interactive system for operating a plurality of flexible displays as claimed in claim 8, wherein each flexible display has a display size; when the system control platform determines the primary and secondary relationship, the system control platform determines a flexible display having a maximum external luminosity value as a primary flexible display and the remaining flexible displays as secondary flexible displays according to the luminosity information; and when the system control platform implements the interactive operation among the plurality of flexible displays the system control platform determines the secondary displays as extended displays of the primary flexible display, and divides a display frame of the primary flexible display into multiple sub-display frames, wherein each sub-display frame corresponds to each flexible display and is transmitted to the corresponding flexible display to display, respectively.

10. The interactive system for operating a plurality of flexible displays as claimed in claim 9, wherein the relative position among the plurality of flexible displays represents that each secondary flexible display corresponds to a relative distance and a relative angle between each secondary flexible display and the primary flexible display, respectively.

11. The interactive system for operating a plurality of flexible displays as claimed in claim 10, wherein when the relative angle between one of the secondary flexible displays and the primary flexible display is not 0, 90, 180, or 270 degrees, the system control platform divides the display frame according to the relative distance and the relative angle between the one of the secondary flexible displays and the primary flexible display by calculating a display size and a display angle on the display frame of the one of the secondary flexible displays corresponding to the display frame of the primary flexible display.

12. An interactive method for operating a plurality of flexible displays, used between the plurality of flexible displays and a system control platform, wherein each flexible display comprises a plurality of light sensors, a plurality of sensors and a processor, the method comprises:

quantifying, by each light sensor, an external luminosity value received by the flexible display;

quantifying, by each sensor, a sensor-measuring value received by the flexible display, and each sensor is one of a pressure sensor and a bending sensor; the sensor-measuring value corresponding to the pressure sensor is a pressure value, and the sensor-measuring value corresponding to the bending sensor is a bending value; and generating and transmitting, by the processor which is coupled to the plurality of light sensors and the plurality of sensors, luminosity information and sensor information according to the external luminosity values and the sensor-measuring values; and receiving, by the system control platform which is coupled to the plurality of flexible displays, the luminosity information and the sensor information, determining a primary and secondary relationship of the plurality of flexible displays according to the luminosity information, and implementing an interactive operation among the plurality of flexible displays according to the sensor information.

13. The interactive method for operating a plurality of flexible displays as claimed in claim 12, wherein each the flexible displays further comprises a near field communication unit, the method further comprises:

sensing, by the near field communication unit, other near field communication units within a specific distance, generating and transmitting sensing data to the system control platform; and grouping, by the system control platform, the plurality of flexible displays which sense between each other into a group according to the sensing data and implementing an interactive operation among the plurality of flexible displays among the plurality of flexible displays of the same group according to the sensor information.

14. The interactive method for operating a plurality of flexible displays as claimed in claim 12, wherein each the flexible displays further comprises a storage unit which is used to store grouping information, the method further comprises:

transmitting, by the processor, the grouping information to the system control platform; and grouping, by the system control platform, the plurality of flexible displays whose grouping information are same into a group according to the grouping information and implementing the interactive operation among the plurality of flexible displays of the group according to the sensor information.

15. The interactive method for operating a plurality of flexible displays as claimed in claim 12, further comprising:

grouping, by the system control platform, the plurality of flexible displays which the system control platform receives the sensor information transmitted by the plurality of flexible displays in a specific time interval into a group according to times of receiving the sensor information transmitted by the plurality of flexible displays, and implementing the interactive operation among the plurality of flexible displays of the group according to the sensor information.

16. The interactive method for operating a plurality of flexible displays as claimed in claim 12, further comprising:

re-determining, by the system control platform, the primary and secondary relationship among a first added flexible display and the plurality of flexible displays according to the luminosity information received by the first added flexible display and the plurality of flexible displays when the first added flexible display is added to the plurality of flexible displays after the system control platform determines the primary and secondary relationship of the plurality of flexible displays.

17. The interactive method for operating a plurality of flexible displays as claimed in claim 12, wherein each of the flexible displays further comprises a storage unit which is used to store position information and the corresponding interactive operation of each sensor of the plurality of flexible displays; and the sensor information includes the sensor-measuring value, the position information and the corresponding interactive operation of the sensor which generates the sensor-measuring value.

18. The interactive method for operating a plurality of flexible displays as claimed in claim 12, wherein each flexible display further comprises a storage unit which is used to store position information indicating the positions where light sensors and sensors are equipped on each flexible display, and the method further comprises:

obtaining, by the processor, the position information corresponding to at least one sensor when the luminosity information is generated by receiving the at least one sensor-measuring value of the at least one sensor, determining at least one neighboring light sensor and using at least one external luminosity received by the at least one neighboring light sensor to generate the luminosity information; a distance between the positions of the at least one neighboring light sensor and the at least one sensor is within a specific range; and the luminosity information includes the at least one neighboring external luminosity value and the position information of the at least one neighboring light sensor; and determining, by the system control platform, a relative position between the plurality of flexible displays which the system control platform receives the luminosity information transmitted by the plurality of flexible displays according to the luminosity information received by the plurality of light sensors within a specific time interval.

19. The interactive method for operating a plurality of flexible displays as claimed in claim 18, wherein each flexible display has a display size; the method further comprises:

when the system control platform determines the primary and secondary relationship, the system control platform determines that a flexible display having a maximum external luminosity value as a primary flexible display, and the remaining flexible displays as secondary flexible displays according to the luminosity information; and when the system control platform implements the interactive operation among the plurality of flexible displays, the system control platform determines that the secondary displays are extended displays of the primary flexible display, and divides a display frame of the primary flexible display into multiple sub-display frames, wherein each sub-display frame corresponds to each flexible display and is transmitted to the corresponding flexible display to display, respectively.

20. A non-transitory computer-readable medium comprising computer programs, which, when executed, cause a device to perform an interactive method for operating a plurality of flexible displays, and the method is used between the plurality of flexible displays and a system control platform, wherein each flexible display comprises a plurality of light sensors, a plurality of sensors and a processor; each light sensor quantifies an external luminosity value received by the flexible display, and each sensor quantifies a sensor-measuring value received by the flexible display; each sensor is one of a pressure sensor and a bending sensor; the sensor-measuring value corresponding to the pressure sensor is a pressure value, and the sensor-measuring value corresponding to the bending sensor is a bending value; the processor is coupled to the plurality of light sensors and the plurality of sensors and the system control platform is coupled to the plurality of flexible displays; and the non-transitory computer-readable medium comprises:

a first computer program code for generating and transmitting luminosity information and sensor information according to the external luminosity values and the sensor-measuring values after being read by the processor; and a second computer program code for receiving the luminosity information and the sensor information, determining a primary and secondary relationship of the plurality of flexible displays according to the luminosity information, and implementing an interactive operation among the plurality of flexible displays according to the sensor information after being read by the system control platform.

\* \* \* \* \*